United States Patent [19]

Hermann et al.

[11] Patent Number: 4,533,601

[45] Date of Patent: Aug. 6, 1985

[54] POLYVINYLBUTYRAL FILMS WHICH CONTAIN PLASTICIZER AND HAVE A REDUCED ADHESIVE POWER ON GLASS

[75] Inventors: Hans D. Hermann, Bad Soden am Taunus; Klaus Fabian, Kriftel; Joachim Ebigt, Frankfurt am Main, all of Fed. Rep. of Germany

[73] Assignee: Hoechst Aktiengesellschaft, Fed. Rep. of Germany

[21] Appl. No.: 575,712

[22] Filed: Jan. 31, 1984

[30] Foreign Application Priority Data

Jan. 31, 1983 [DE] Fed. Rep. of Germany ....... 3303156

[51] Int. Cl.$^3$ ................... C08L 29/14; C08L 29/04; C08K 3/22; C08K 5/17
[52] U.S. Cl. ................................. 428/437; 524/157; 524/394; 524/503; 525/56; 525/61
[58] Field of Search .................. 524/394, 503, 157; 428/437; 525/56, 61

[56] References Cited

U.S. PATENT DOCUMENTS

| | | | |
|---|---|---|---|
| 3,271,233 | 9/1966 | Lavin et al. | 428/437 |
| 3,271,234 | 9/1966 | Lavin et al. | 428/437 |
| 3,271,235 | 9/1966 | Lavin et al. | 428/437 |
| 3,920,878 | 11/1975 | Fariss et al. | 428/437 |
| 4,017,444 | 4/1977 | Mont et al. | 524/288 |
| 4,027,069 | 5/1977 | Mont et al. | 428/524 |
| 4,165,565 | 7/1979 | Hermann et al. | 524/157 |
| 4,210,705 | 7/1980 | Inskip | 428/437 |
| 4,292,372 | 9/1981 | Moynihan | 525/61 |
| 4,379,116 | 4/1983 | Moynihan | 524/400 |

*Primary Examiner*—Herbert J. Lilling
*Attorney, Agent, or Firm*—Berman, Aisenberg & Platt

[57] ABSTRACT

The reduction of the adhesion to glass of thermoplastic polyvinylbutyral molding compositions, in particular films, which contain plasticizer and in which the polyvinylbutyral component has an increased content of vinyl alcohol units, by addition of a combination of potassium hydroxide, potassium formate or potassium acetate and a compound having a betaine structure, as the antiadhesive agent. Use of the films with reduced adhesion to glass as the bonding layer for the production of glass laminates.

14 Claims, No Drawings

POLYVINYLBUTYRAL FILMS WHICH CONTAIN PLASTICIZER AND HAVE A REDUCED ADHESIVE POWER ON GLASS

Laminated glass consists of two or more sheets of glass held together by films of plastic. The intermediate layer of plastic ensures that the laminated sheet is not penetrated on impact and that no splinters of glass thereby fly off.

So that the film can fulfill this object, it must have a quite definite adhesion to the glass. If this adhesion is too high, the glass does not become detached from the film at all under impact, and instead the film is immediately overstretched and tears at the crack in the glass. If the adhesion is too low, splinters of glass become detached from the sheet. Only if the adhesion to glass is correct does the film detach itself slightly at the crack in the glass, so that it cannot be overstretched and can receive the shock in a resilient manner, without splinters of glass flying off from the laminate.

Polyvinylbutyral films containing plasticizer have long since proved suitable as the intermediate layer for laminated glass. It is known that the adhesion of polyvinylbutyral to glass, which is usually too high, can be reduced in a defined manner. This is most simply effected by adding water. However, with strongly adhering films, the water content must be so high (>0.8% by weight), that it can lead to the formation of bubbles in Adjustment of the adhesion to glass by addition of various alkali metal salts, alkaline earth metal salts or salts of other metals is also known. Salts which have proved particularly suitable are alkaline potassium compounds, such as potassium hydroxide and potassium acetate, or potassium salts such as are described, for example, in German Pat. No. 1,289,261 for reducing the adhesion to glass. Betaines, such as are described, for example, in German Offenlegungsschrift No. 2,646,280, and other compounds having a betaine structure are also good anti-adhesive agents.

Some of the compounds mentioned are outstandingly suitable for reducing the adhesion of plasticized polyvinylbutyral films to glass in a controlled manner and hence for increasing the resistance of glass laminates made from these films to penetration.

Difficulties may, however, arise if a polymer which contains 21% by weight or more of vinyl alcohol units incorporated in the polymer is used as the polyvinylbutyral. Plasticized films of such polymers have a very high strength and are therefore of particular interest. However, a considerable disadvantage of these films is their unusually high adhesion to glass. In order to achieve optimum adhesion to glass, high anti-adhesive agent concentrations are required. These, for example in the case of the potassium salts, go far beyond the proportions described in German Pat. No. 1,289,261, and lead to discoloration of the films and to impairment of the intermolecular forces in the polymer and hence of the strength. The effect achieved by increasing the vinyl alcohol content in the polymer is thus lost again due to the addition of potassium salts.

Betaines do not have these disadvantages as anti-adhesive agents, but these also must be used in relatively high concentrations. However, in the presence of high amounts of betaine, the adhesion to the glass often depends on the processing conditions, i.e. the adhesion to glass achieved is greater under severe processing conditions, for example at extrusion temperatures of more than 210° C., than under mild processing conditions, for example at extrusion temperatures of 170° C. This impairs the reproducibility of the adjustment of the adhesion.

Surprisingly, it has now been found that the adhesion of the films to glass can be adjusted to the required level reproducibly and without impairment of the color or strength of the films if a combination of potassium hydroxide, potassium formate or potassium acetate and betaines is used as the anti-adhesive agent.

The invention thus relates to a method of reducing the adhesion to glass of thermoplastic polyvinylbutyral molding compositions, in particular films, which contain plasticizer and in which the polyvinylbutyral component preferably contains 21–28% by weight of vinyl alcohol units (based on the polyvinylbutyral), by mixing the molding composition constituents with an anti-adhesive agent from the group of alkaline metal compounds and betaines, which comprises using, as the anti-adhesive agent, a combination of (a) potassium hydroxide, potassium formate or potassium acetate in an amount corresponding to an alkali titer of between 10 and 200 (based on the polyvinylbutyral) and (b) 0.005 to 0.5% by weight (based on the polyvinylbutyral) of a compound having a betaine structure, preferably a betaine, sulfobetaine, phosphobetaine or a mixture of these compounds.

The alkali titer is defined here as the number of milliliters of 0.01N hydrochloric acid required to neutralize 100 g of polyvinylbutyral which has been mixed with an appropriate amount of potassium hydroxide, potassium formate or potassium acetate. For this, the mixture of polymer and alkaline metal compound is titrated in ethanolic solution with 0.01N hydrochloric acid and bromophenol blue as the indicator. The preferred range of the alkali titer is 20–150, in particular between 30 and 100. If an alkaline metal compound is used by itself as an anti-adhesive agent instead of in the claimed combination, the amounts mentioned above under (a) are generally insufficient to reduce to an optimum value the adhesion to glass of polyvinylbutyral films which contain plasticizer and have a high content of vinyl alcohol units in the polyvinylbutyral.

In principle, all organic compounds which, in addition to a quaternary ammonium group, contain a carboxylate, sulfonate, phosphonate or phosphate group can be used as the betaines. Examples of suitable compounds of this type are the betaines and sulfobetaines described in German Offenlegungsschrift No. 2,646,280, and betaines which have surface-active properties and a long-chain aliphatic radical with 8–30 carbon atoms are also particularly suitable. Finally, betaines with phosphonic acid or phosphoric acid groups, such as, for example, lecithin, also show a good activity in the combination according to the invention.

Examples of effective betaines which may be mentioned are:

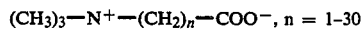

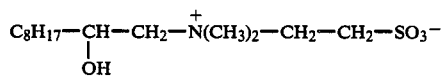

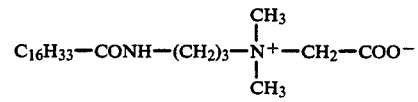

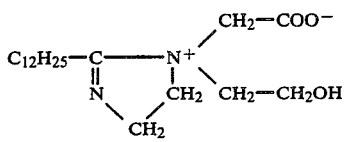

The concentration of the betaines can be between 0.005 and 0.5% by weight, based on the polyvinylbutyral. Concentrations of between 0.01 and 0.3% by weight are preferably used.

The use of the combination of potassium compound and betaine permits the adhesion of, in principle, all conventional polyvinylbutyral films to glass to be reduced and adjusted to optimum use values. According to the invention, the claimed anti-adhesive agent combination, however, is preferably used for high-strength polymers which contain plasticizer and have a content of polyvinyl alcohol units in the polyvinylbutyral of 21-28% by weight. In this range, it was hitherto not possible to reduce the adhesion of the plasticized polymer to glass to an optimum value in a reproducible manner without the resulting film discoloring and being of impaired in strength.

Since these difficulties can now be overcome according to the invention, it is possible either to produce glass laminates with an increased average breaking height which has not hitherto been achieved, or, by setting the breaking height at the prior art level, to reduce the film thickness or the thickness of the glass.

The anti-adhesive agents can be mixed with the polymer or polymer/plasticizer mixture in any desired manner before or during processing. Thus, for example, the anti-adhesive agent system can be dried onto the polymer from solution, preferably from aqueous solution, i.e. the solution is dispersed in the polymer and the water is then removed by evaporation. Mixing of the dry and powdered anti-adhesive agent into the polymer powder is somewhat less favorable. It may also be advantageous to meter in an aqueous or organic, preferably alcoholic, solution of anti-adhesive agent during extrusion. It is also advantageous to add the anti-adhesive agent system in dissolved form, for example in methanol, to the plasticizer, or, if surface-active betaines (see above) are used, to emulsify the system in aqueous distribution in the plasticizer. The type of mixing should therefore be decided on from case to case, depending on the solubility of the anti-adhesive agent component. Excess water or solvents can be removed again by evaporation during processing.

The polyvinylbutyrals used can be prepared in any desired known manner, for example by the process of German Pat. No. 2,732,717. Polyvinylbutyrals with a content of vinyl alcohol units of preferably 21-28% by weight and optionally a content of vinyl acetate units of preferably up to 5% by weight, in particular up to 3% by weight, are particularly suitable for preparation of high-strength films for which there are particular problems in adjusting the adhesion to glass to an optimum level. Polyvinylbutyrals with a vinyl alcohol content of between 22 and 26% by weight are particularly preferred.

The viscosity of the polymers to be used is within the usual range. Polyvinylbutyrals with a viscosity in 5% strength ethanolic solution at 23° C. of between 30 and 200 mPa.s (measured according to DIN 53015) are particularly suitable.

The plasticizer components used are known from the prior art. Preferably, those plasticizers which, under the conditions to be maintained, are compatible with the polymers to be used according to the invention are used. Thus, for polymers with up to about 21-22% by weight of incorporated vinyl alcohol units, it is possible to use, for example, esters of di-, tri- or tetra-ethylene glycol with aliphatic linear or branched carboxylic acids having 5-10 carbon atoms, or esters of phthalic acid with alcohols having 4-10 carbon atoms. The compatibility of these plasticizers is frequently insufficient for polymers with a higher content of vinyl alcohol units.

In this case, the phthalic acid esters mentioned can be used as a mixture with phosphoric acid esters, the phosphoric acid ester being used in the mixture in an amount such that the desired compatibility is reached. It has furthermore also already been proposed that mixtures of glycol esters and phosphoric acid esters should be used as plasticizers.

Besides these particularly preferred plasticizers, it is also possible to use other plasticizers, such as, for example, adipic acid esters and sebacic acid esters as well as phosphoric acid esters, by themselves or as admixtures.

The concentration of plasticizer in the polymer/plasticizer mixture can be between 20 and 40% by weight, preferably between 25 and 35% by weight. Plasticizer concentrations of 27-32% by weight are particularly preferred. If the plasticizer concentrations are too low, the processability of the mixtures may be impaired, and if the plasticizer concentration is too high, the required film strength is no longer achieved.

Besides the claimed anti-adhesive agents, the polymer/plasticizer mixture can also contain other customary additives, such as, for example, stabilizers and antiblocking agents, in the customary concentrations of between 0.01 and 1% by weight, based on the mixture.

The polymer, plasticizer and additives can be processed in a known manner on a calender or in an extruder to give films, preferably 0.3-1.5 mm thick.

The finished glass laminated film is processed in the customary manner with sheets of glass to the laminate, if necessary after being kept under climatically controlled conditions, which is necessary in order to adjust the water content of the film to about 0.2-0.8% by weight. It is desirable to adjust the water content, because this additionally reduces the adhesion to glass. However, the stated water concentration should not be exceeded, so that no bubble formation occurs during processing.

For the production of glass laminates, for example, the film is placed between sheets of glass 1-3 mm thick and the sheets are pressed at 60°-100° C. to give a prelaminate. The end laminate is produced from this, for example, in an autoclave at 120°-160° C. under 8-16 bar. In the experiments described in the examples, the panes of glass were washed with demineralized water before production of the laminates.

The laminate can be subjected to an extensive test program to test the quality.

The so-called pummel test is frequently used to evaluate the quality of the laminate, in particular the adhesion to the glass. In this test, a glass laminate is cooled to −18° C., placed on a metal substrate and hit with a hammer weighing 500 g. Depending on the amount of glass which thereby becomes detached from the film, the laminate is evaluated with pummel values of between 0 (no adhesion) and 10 (complete adhesion). A detailed description of the test can be found in British Pat. No. 1,093,864.

The adhesion to glass can be very easily determined by a shearing test, which is described in detail in German Offenlegungsschrift No. 3,038,449. Laminated strips of float glass 3 mm thick, which had been washed with demineralized water, and polyvinylbutyral films of the thickness stated in the examples were used in the measurements carried out in the examples which follow. The strips had dimensions of about 100×15 mm, and the laminate area to be sheared, which was measured exactly before each tensile test, was about 15×7 mm.

The strips of laminate were drawn at a speed of 20 cm/minute in a commercially available apparatus from Instron.

The optimum shear strength, adjustment of which leads to high-impact glass laminates, is generally between 1.5 and 5 N/mm$^2$, preferably between 2 and 4 N/mm$^2$. A particularly preferred range is between 2.5 and 3.5 N/mm$^2$. High-strength films can have somewhat higher shear strengths than less strong films, without detriment. This at the same time reduces the danger of splintering of the glass when broken.

The most important test method in practice is the falling-ball test according to DIN 52306 (dynamic method). For this, glass laminates about 30×30 cm in size are produced from two sheets of float glass 3 mm thick and polyvinylbutyral films 0.76 mm or 0.6 mm thick, which contain plasticizer. Using a steel ball weighing 2.26 kg, the average breaking height is determined for the laminates, which is the height at which half of the sheets tested are penetrated.

The invention is illustrated in more detail by the following examples.

EXAMPLE 1

Samples of a polyvinylbutyral containing 22.5% by weight of vinyl alcohol units were extruded at 170° C. and at 240° C. with 29% by weight (based on the polymer plasticizer mixture) of a triglycol ester of aliphatic $C_6$–$C_9$-carboxylic acids, the anti-adhesive agents shown in Table 1 first having been dried, in the stated amounts, onto the polymer used. 0.1% by weight (based on the polymer/plasticizer mixture) of ditert.-butyl-p-cresol was added as a heat stabilizer. 0.8 mm thick films were pressed from the polymer/plasticizer mixtures thus prepared, and glass laminates 30×30 cm in size were produced from these films and sheets of float glass 3 mm thick. When these laminates were tested, the results summarized in Table 1 were obtained.

As the shear strengths of comparison samples (a) to (d) show, the films produced from the materials extruded at 240° C. have significantly higher shear strengths than the films produced from the same materials extruded at 170° C. In contrast, in samples (e) to (g) according to the invention, after extrusion of the materials at 170° C. and 240° C., the shear strengths of the films produced from the extruded materials deviate from one another only very insignificantly. Similar advantageous results and hence a clear superiority over the comparison samples (a) to (d) were also shown by samples (e) to (g) according to the invention in the pummel test.

The results in Table 1 thus clearly demonstrate the pronounced insensitivity to temperature of anti-adhesive agent systems according to the invention in comparison with the sole use of betaines.

TABLE 1

| Sample | Anti-adhesive agent (based on the polymer) | | Shear strength (N/mm$^2$) | | Pummel | |
| | Potassium formate (alkali titer) | Betaine (% by weight) | Extrusion: 170° C. | 240° C. | 170° C. | 240° C. |
|---|---|---|---|---|---|---|
| (a) Comparison | — | 0,15 $C_{16}H_{33}CONH(CH_2)_3-\overset{CH_3}{\underset{CH_3}{N^+}}-CH_2-COO^-$ (I) | 2.8 | 3.9 | 4 | 6 |
| (b) Comparison | — | 0,15 $C_{18}H_{37}-\overset{CH_3}{\underset{CH_3}{N^+}}-CH_2-\overset{OH}{CH}-CH_2-SO_3^-$ (II) | 2.5 | 3.3 | 3 | 5 |
| (c) Comparison | — | 0,04 $C_{12}H_{25}-C(=N)(CH_2CH_2)N^+-CH_2-COO^-, CH_2-CH_2-OH$ (III) | 1.8 | 2.9 | 0–1 | 4 |
| (d) Comparison | — | 0,14 $C_{18}H_{37}-\overset{CH_3}{\underset{CH_3}{N^+}}-CH_2-CH_2-SO_3^-$ | 2.9 | 3.9 | 5 | 7 |
| (e) | 50 | 0,07 I | 2.8 | 2.9 | 4 | 4 |
| (f) | 35 | 0,025 II | 2.7 | 2.8 | 4 | 4 |
| (g) | 60 | 0,03 III | 2.3 | 2.7 | 3 | 4 |

EXAMPLE 2

The same polyvinylbutyral as described in Example 1 was extruded at 170° C. and pressed to films in a manner analogous to that described in Example 1. 29% by weight (based on the polymer/plasticizer mixture) of triethylene glycol diheptanoate was used as the plasticizer, together with the anti-adhesive agents shown in the following Table 2, in the amounts stated. Glass laminates were produced from the films as described in Example 1.

The results of the experimental series reproduced in Table 2 show that for comparable adjustment of the adhesion with potassium acetate by itself, such high amounts of anti-adhesive agent must be used that the film becomes significantly discolored.

TABLE 2

| Sample | Anti-adhesive agent (based on the polymer) | | Shear strength (N/mm$^2$) | Average breaking height (m) | Color number[+] |
|---|---|---|---|---|---|
| | Potassium acetate (alkali titer) | III (cf. Table 1) (% by weight) | | | |
| (a) | 60 | 0.015 | 3.2 | 6.4 | 2 |
| (b) | 80 | 0.015 | 2.9 | 6.6 | 2 |
| (c) | 170 | 0.015 | 2.7 | 6.5 | 3 |
| (d) | 60 | 0.007 | 3.6 | 5.8 | 2 |
| (e) Comparison | 170 | — | 4.0 | 5.5 | 3 |
| (f) Comparison | 240 | — | 3.7 | 6.2 | 5 |

[+] according to German Patent 2,208,167:
0 = not discolored
10 = Light brown

EXAMPLE 3

A polyvinylbutyral containing 24.2% by weight of vinyl alcohol units was kneaded in a Brabender kneader for 10 minutes at 150° C. with 29% by weight (based on the polymer/plasticizer mixture) of a plasticizer composed of 80% by weight of triethylene glycol heptanoate and 20% by weight of trioctyl phosphate. The anti-adhesive agents shown in Table 3 were in each case added to the plasticizer in 5% strength by weight methanolic solution, with stirring, shortly before processing. 0.76 mm thick films were pressed from the kneaded samples, and, after the films had been kept under climatically controlled conditions, laminates were produced from these films with sheets of float glass 3 mm thick. The test results are summarized in Table 3.

TABLE 3

| Sample | Anti-adhesive agent (based on the polymer) | | Betaine (% by weight) | Color number | Shear strength (N/mm$^2$) |
|---|---|---|---|---|---|
| | Potassium formate (alkali titer) | Potassium acetate (alkali titer) | | | |
| (a) | — | 72 | 0.07 III[+] | 1-2 | 3.6 |
| (b) | 84 | — | 0.14(CH$_3$)$_3$—N$^+$—CH$_2$COO$^-$ | 1-2 | 2.9 |
| (c) | 84 | — | 0.06 II[+] | 1-2 | 3.8 |
| (d) Comparison | — | 215 | — | 3 | 5.2 |
| (e) Comparison | 135 | — | — | 2-3 | 4.1 |

[+] cf. Table 1)

The experimental results show the superiority of the anti-adhesive formulations according to the invention (samples a to c), more advantageous shear strengths together with less discoloration being obtained than when potassium salts are used by themselves (samples d and e).

EXAMPLE 4

A methanolic solution of 5% by weight of potassium formate and 5% by weight of III (cf. Table 1) was added to a plasticizer combination of triethylene glycol diheptanoate/trioctyl phosphate 8:2, as the anti-adhesive agent, while stirring. A polyvinylbutyral containing 23.6% by weight (based on the polymer) of vinyl alcohol units was extruded with this mixture to a film 0.76 mm thick. The plasticizer content of the film was 30% by weight (based on the polymer/plasticizer mixture), the alkali titer established was 70 and the betaine content was 0.06% by weight (in each case based on the polymer).

Glass laminates produced from this film as described in Example 1 were clear and had a shear strength of 3.8 N/mm$^2$ and an average breaking height of 7.3 m.

EXAMPLE 5

A plasticized polyvinylbutyral film 0.76 mm thick contained 63% by weight of a polyvinylbutyral with a content of vinyl alcohol units of 24.2% by weight, based on the polymer, and 37% by weight of trioctyl phosphate, as the plasticizer. The anti-adhesive system was composed of potassium formate, corresponding to an alkali titer of 55, and 0.015% by weight of III (cf. Table 1), in each case based on the polymer. The shear strength of the film in the glass laminate was 3.3 N/mm$^2$ and the average breaking height of the laminates was 5.5 m. In the absence of anti-adhesive agent, a laminate produced in the same manner had a shear strength of 7.5 N/mm$^2$ and an average breaking height of 2.8 m.

EXAMPLE 6

As described in Example 3, a polymer/plasticizer mixture was processed in the presence of anti-adhesive agents in a Brabender kneader now for 20 minutes at 170° C., instead of for 10 minutes at 150° C. The polymer used was 65% by weight of a polyvinylbutyral with a content of vinyl alcohol units of 26.0% by weight, based on the polymer, and, as the plasticizer, 35.0% by weight (based on the polymer/plasticizer mixture) of a mixture of 20% by weight of dihexyl phthalate and 80% by weight of trioctyl phosphate. The anti-adhesive agents were added to the plasticizer as described in Example 3. The following Table 4 shows the experimental results.

TABLE 4

| Sample | Anti-adhesive agent (based on the polymer) | | Color number | Tear strength (N/mm²) | Shear strength (N/mm²) |
|---|---|---|---|---|---|
| | Potassium acetate (alkali titer) | Betaine (% by weight of III[(+)]) | | | |
| (a) | 157 | 0.07 | 10 (light brown) | 25.5 | 3.4 |
| (b) Comparison | 314 | — | 15 (dark brown) | 23.5 | 6.0 |

[(+)]cf. Table 1

Under the more severe processing conditions chosen in Example 6 (higher temperature, longer residence time than in Example 3), the conventional anti-adhesive agent (sample b) leads to greater discoloration coupled with an inadequate anti-adhesive action (i.e. too high a shear strength)—in contrast to the anti-adhesive system according to the invention (sample a).

EXAMPLE 7

The anti-adhesive agents given in Table 5 which follows were dried, from aqueous solution, onto a polyvinylbutyral containing 22.5% by weight of vinyl alcohol units, based on the polymer. The polymer was then kneaded in a Brabender kneader for 20 minutes at 50 revolutions per minute and at 170° C. together with 29.5% by weight (based on the polymer/plasticizer mixture) of triethylene glycol bis-2-ethylbutyrate. Laminate films 0.76 mm thick were pressed from the polymer/plasticizer mixture in a known manner, and glass laminates were produced therefrom. Table 5 which follows shows the results of testing. The impairment of the intermolecular forces by the alkali is most clearly recognizable when the flow properties of the polymer/plasticizer mixture are measured at relatively low temperatures. In the present case, this was effected by determining the melt index (analogously to DIN 53735) at 80° C. under a 20 kg load. Besides the increase in the flow properties, comparison experiment (c) shows, in particular, the impairment of strength and an increase in the discoloration. Similar results were obtained when potassium hydroxide was replaced by potassium acetate.

TABLE 5

| Sample | Anti-adhesive agent (based on the polymer) | | Melt index $i_{20}$ 80° C. (mg/hour) | Color number | Strength at 100% elongation (N/mm²) | Shear strength (Laminate) (N/mm²) |
|---|---|---|---|---|---|---|
| | KOH (alkali titer) | $^+N(CH_3)_3$—$CH_2$—$COO^-$ (% by weight) | | | | |
| (a) Comparison | 50 | — | 110 | 7 | 3.5 | 7.5 |
| (b) | 50 | 0.025 | 120 | 6 | 3.4 | 2.8 |
| (c) Comparison | 240 | — | 430 | 11 | 2.8 | 3.2 |

EXAMPLE 8

Various plasticized polyvinylbutyral films 0.76 mm thick were produced by extrusion at 190° C. The composition of the films, the anti-adhesive agents used and properties of the films and glass laminates produced therefrom can be seen from the following Table 6.

TABLE 6

| | Vinyl alcohol units in the polymer (% by weight) | Plasticizer: n-heptanoic acid triglycol ester content (% by weight, based on the plasticized mixture) | Anti-adhesive agent (based in the polymer): | | Strength at 100% elongation (N/mm²) | Shear strength (N/mm²) | Average breaking height (m) |
|---|---|---|---|---|---|---|---|
| | | | potassium acetate (alkali titer) | III[(+)] (% by weight) | | | |
| (a) Comparison | 19.5 | 29 | 80 | 0.028 | 1.9 | 1.7 | 5.80 |
| (b) | 21.9 | 29 | 80 | 0.028 | 3.5 | 2.9 | 6.60 |
| (c) | 21.9 | 29 | 20 | 0.035 | 3.5 | 3.3 | 6.90 |

[(+)]cf. Table 1

It can be seen that, at an equally high plasticizer content, polymers with a low content of vinyl alcohol units are weaker (sample a) than polymers with a high vinyl alcohol content (samples b and c). This disadvantage can be compensated, for example, by lowering the plasticizer content of the films, but this leads to deterioration in the processability and is uneconomical.

EXAMPLE 9

The example shows the anti-adhesive action, according to the invention, of the system lecithin potassium formate on polyvinylbutyral films of various polymers and plasticizers. The films from samples a to d were uniformly 0.76 mm thick. The composition of the films can be seen from Table 7.

TABLE 7

| | Vinyl alcohol units in the polymer (% by weight) | Plasticizer[(+)] in the film (% by weight) | Anti-adhesive agent (based on the polymer) | | Shear strength (N/mm²) | Average breaking height (m) |
|---|---|---|---|---|---|---|
| | | | potassium formate (alkali titer) | soya lecithin (% by weight) | | |
| (a) | 22.5 | 32 DBP | 20 | 0.03 | 1.7 | 6.30 |
| (b) | 23.2 | 35 DHP/TOF 7:3 | 28 | 0.04 | 2.4 | 6.10 |
| (c) | 22.2 | 31 BB | 20 | 0.03 | 2.3 | 5.90 |

TABLE 7-continued

| Vinyl alcohol units in the polymer (% by weight) | Plasticizer(+) in the film (% by weight) | Anti-adhesive agent (based on the polymer) | | Shear strength (N/mm²) | Average breaking height (m) |
|---|---|---|---|---|---|
| | | potassium formate (alkali titer) | soya lecithin (% by weight) | | |
| (d) 24.0 | 31 DO/TOF 6:4 | 58 | 0.05 | 2.2 | 7.20 |

(+)DBP = dibutyl phthalate
DHP = dihexyl phthalate
DOP = dioctyl phthalate
TOF = trioctyl phosphate
BB = butyl benzyl phthalate

EXAMPLE 10

A polyvinylbutyral film 0.6 mm thick containing 22.6% by weight of vinyl alcohol units, based on the polymer, 28% by weight of a plasticizer, based on the polymer/plasticizer mixture, of triethylene glycol bis-2-ethylbutyrate/trioctyl phosphate 9:1 and an addition of potassium formate corresponding to an alkali titer of 25, and 0.033% by weight of III (cf. Table 1), in each case based on the polymer, was processed to a glass laminate which had a shear strength of 2.9 N/mm² and an average breaking height of 5.55 m. In the absence of the anti-adhesive agent, a laminate produced for comparison from the same components had, in contrast, a shear strength of 9.1 N/mm² and an average breaking height of 1.50 m. After a storage time of one year in the open air, the laminate according to the invention showed no detachment of the film at the edges.

We claim:

1. A method of reducing adhesion to glass of a thermoplastic polyvinylbutyral molding composition, which contains plasticizer and in which the polyvinylbutyral component contains 21–28% by weight of vinyl alcohol units (based on the polyvinylbutyral), by mixing constituents of the molding composition with an anti-adhesive agent combination of
   (a) potassium hydroxide, potassium formate or potassium acetate in an amount corresponding to an alkali titer of between 10 and 200 (based on the polyvinylbutyral) and
   (b) 0.005 to 0.5% by weight (based on the polyvinylbutyral) of a compound having a betaine structure.

2. The method as claimed in claim 1, wherein component (b) is a betaine, sulfobetaine or phosphobetaine or a mixture of these compounds.

3. The method as claimed in claim 1, wherein the molding composition is a film.

4. A polyvinylbutyral film which contains a plasticizer, has reduced adhesion to glass and is produced as claimed in claim 3.

5. The use of a polyvinylbutyral film, as claimed in claim 1, which contains a plasticizer and has reduced adhesion to glass, for production of a glass laminate.

6. A glass laminate containing a polyvinylbutyral film, as claimed in claim 1, which contains a plasticizer and has reduced adhesion to glass, as the bonding layer.

7. A plasticizer-containing thermoplastic polyvinylbutyral molding composition having reduced adhesion to glass, having a polyvinylbutyral component with from 21 to 28 percent by weight of vinyl alcohol units (based on the polyvinylbutyral) and wherein constituents of the molding composition are in admixture with an anti-adhesive agent combination of:
   (a) a member selected from the group consisting of potassium hydroxide, potassium formate and potassium acetate in an amount corresponding to an alkali titer of between 10 and 200 (based on the polyvinylbutyral) and
   (b) from 0.005 to 0.5 percent by weight (based on the polyvinylbutyral) of a compound having a betaine structure.

8. A molding composition as claimed in claim 7 in film form.

9. A molding composition as claimed in claim 8 wherein component (a) is potassium hydroxide.

10. A molding composition as claimed in claim 8 wherein component (a) is potassium formate.

11. A molding composition as claimed in claim 8 wherein component (a) is potassium acetate.

12. A molding composition as claimed in claim 8 wherein component (b) is a betaine.

13. A molding composition as claimed in claim 8 wherein component (b) is a sulfobetaine.

14. A molding composition as claimed in claim 8 wherein component (b) is a phosphobetaine.

* * * * *